Figure 1:
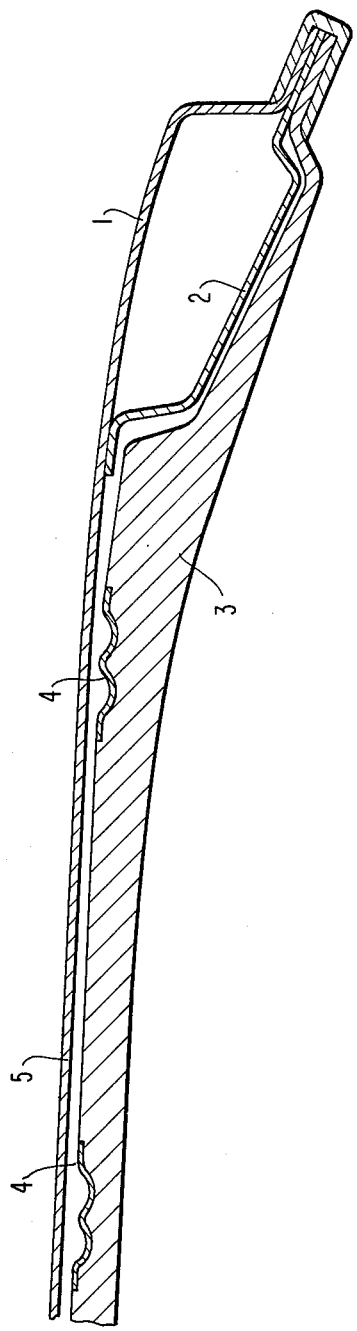

United States Patent [19]

Alfter et al.

[11] 4,020,207
[45] Apr. 26, 1977

[54] INTERIOR COVERING WITH REINFORCEMENT

[75] Inventors: Franz-Werner Alfter, Siegburg; Joachim Becke, Troisdorf; Hans-Ulrich Breitscheidel, Troisdorf; Herbert Laubenberger, Troisdorf, all of Germany

[73] Assignee: Dynamit Nobel Aktiengesellschaft, Germany

[22] Filed: Dec. 7, 1973

[21] Appl. No.: 422,725

[30] Foreign Application Priority Data

Dec. 7, 1972 Germany .......................... 2259862
Apr. 27, 1973 Germany .......................... 2321282

[52] U.S. Cl. .............................. 428/138; 296/31 P; 296/137 A; 428/159; 428/182; 428/310; 428/314; 428/315

[51] Int. Cl.² .......................................... B32B 3/26

[58] Field of Search ............ 264/45; 161/160, 161; 296/137 A, 31 R, 31 P; 428/310, 315, 320, 314, 321, 158, 322, 182, 159, 116, 137, 117, 138, 69, 71, 73

[56] References Cited

UNITED STATES PATENTS

| | | | |
|---|---|---|---|
| 3,068,043 | 12/1962 | Komenda | 161/161 |
| 3,213,071 | 10/1965 | Campbell | 161/160 UX |
| 3,506,532 | 11/1970 | Bock et al. | 428/158 |
| 3,557,265 | 1/1971 | Chisholm et al. | 161/161 |
| 3,608,006 | 9/1971 | Hosoda et al. | 156/79 |
| 3,697,126 | 10/1972 | Tiffin | 161/160 |
| 3,812,225 | 5/1974 | Hosoda | 260/2.5 E |
| 3,867,240 | 2/1975 | Doerfling | 296/137 A |

FOREIGN PATENTS OR APPLICATIONS 1,362,035  4/1964  France ................. 161/160

*Primary Examiner*—William J. Van Balen
*Attorney, Agent, or Firm*—Craig & Antonelli

[57] ABSTRACT

An interior covering for automotive vehicles, containers, or the like, which is insulating and optionally constructed to be self-supporting, comprising at least two sheets of polyethylene foam of identical or different density permanently bonded together with a reinforcing polymer-containing layer to form a multiple-layered structure.

16 Claims, 2 Drawing Figures

U.S. Patent      April 26, 1977      4,020,207

INTERIOR COVERING WITH REINFORCEMENT

This invention relates to an interior covering of automotive vehicles, containers, or the like, wherein an insulating lightweight material is desired which can be mounted or fitted within a minimum amount of time. Especially for the roof linings of automobiles, the so-called "dome", there is a need for a covering having such properties that it simultaneously is structurally rigid and is self-supporting, if possible.

More particularly, this invention relates to an insulating interior covering, wherein polyethylene foam sheets of the same or different density applied on one or both sides are permanently bonded to at least one reinforcing layer to form a multiple-layer unitary structure.

The covering materials employed heretofore, such as soft polyurethane foam, artifical leather, phenol-resin-impregnated fibrous nonwovens, and stitched nonwoven materials, are, in contrast to the present invention, utilized as a mere lining or coating of the vehicle roof and cannot be provided as self-supporting, and are at the same time particularly lightweight.

The disadvantages of the previous covering are overcome by an insulating interior covering, optionally formed to be self-supporting, having at least two polyethylene foam layers or sheets bonded together by an intermediate reinforcing polymer-containing layer.

The multiple-layered covering of this invention can be produced as a single panel or unitary laminate structure by forming layers of the above-mentioned covering material into a flat web or sheet reinforced with a reinforcing material. The individual structures are preferably used as sheet stock.

The coverings or panels cut from the webs or sheets, can be deformed within certain limits in spite of the thus-obtained flexural strength, so that they can be adapted, for example, to the shape of an automobile roof or of a container.

Especially for use as a car dome, a self-supporting construction of the multiple-layered laminated covering or cover element is very strongly preferred. This laminated covering, then, is supported only on the lateral parts of the vehicle, on a frame, or on a small number of mounting supports, or on a minor number of externally attached holders. The underside of the car dome can be provided, simultaneously with the manufacture or subsequently thereto, with a decorative layer of a sound-absorbing layer, deadening the sound of the air flow.

In addition to being used preferably as interior covering for automotive vehicles and containers, especially as a roof lining constituting the dome of an automobile, the multiple-layered laminate structure can generally be utilized, inter alia, as a shock-absorbing, elastic, and simultaneously flexurally strong structural panel, for example for the covering of containers, as a longitudinal member for automotive vehicles, as a padded panel, e.g. automobile dash, and as a covering serving for soundproofing and being capable to be self-supporting.

It is one object of the present invention to obtain the flexural strength and structural rigidity of such interior covering by a more advantageous and more economical construction of the reinforcing layers. Therefore, it is further suggested in accordance with the invention to fashion the reinforcing layers as reinforcing shaped or profiled members spanning the interior covering in the longitudinal direction and/or transverse direction.

These reinforcing members are applied advantageously on the backside of the interior covering, i.e., for example on the side facing a car body roof and are cemented to the interior covering or are firmly bonded to the foam material of the interior covering by the effect of heat.

It has proven to be especially advantageous to employ reinforcing members which have a contoured configuration as seen in cross section, for example corrugated members, which satisfy the mechanical requirements to an especially great extent, so that only a relatively low number of reinforcing members need to utilized in a particular interior covering. Suitable materials for the reinforcing profile members are, in addition to sheet-metal strips, also synthetic resins, especially thermosets such as polyethylene and polypropylene.

One embodiment of the interior covering of the present invention, constructed as a car dome, provides that the dome manufactured, e.g. pressed, from polyethylene foam, is provided on its backside with a coarse-mesh reinforcing grid composed of, for example, corrugated sheet-metal strips, e.g. steel metal strips, which grid spans the car dome in the longitudinal direction and/or transverse direction. The reinforcing grid is joined to the polyethylene foam dome, for example, by cementing or solely under the effect of heat. Additionally to functioning as supports for the polyethylene foam dome, the bars of the reinforcing grid can simultaneously serve as fastening elements for the entire dome within the car body.

As polyethylene foam panels, it is possible to employ those of non-crosslinked polyethylene foam, but those of crosslinked polyethylene foam are particularly preferred.

Preferred reinforcing materials for purposes of preparing the laminated covering of this invention are thermoplastic of thermosetting synthetic resins, particularly panels or sheets of polyethylene, polypropylene or ethylene-propylene copolymers; also vulcanized rubber fiber panels and panels or sheets of kraft paper or other cellulose materials impregnated with, for example, phenolic resin or melamine resin may be utilized. Moreover, panels or sheets made from PVC, expanded metal, e.g. steel, metallic mesh, or resin-impregnated glass-fiber, nonwovens or fabrics are also possible reinforcing materials.

These reinforcing materials can form continuous surfaces; also a surface provided with knubs, grids, or ribs is advantageous. Grid-shaped or arbitrarily perforated panels (or sheets), or panels consisting of flat or upright ridges and/or with a honeycomb pattern are preferred, as well as panels having strips and/or bands of the aforementioned configurations.

Due to the desirable saving in weight, an extensive perforation of the panels or sheets is advantageous. The synthetic resin employed can be reinforced, for example with glass fibers.

It is possible to provide additional intermediate layers for the multiple-layered laminate covering, for example to construct the laminate from two reinforced panels, wherein the interposed foam sheets then preferably exhibit a higher weight per unit volume than the external foam layers. Also the foam layer forming the backside of the covering in the installed position can have a higher weight per unit volume.

The multiple-layered laminate covering can be produced in accordance with all methods suitable for obtaining a permanently firm bond between layers.

For example, foam sheets preheated by direct or indirect heating can be joined to the reinforcing panels in a laminating apparatus with the use of a minor amount of pressure.

The heating step can be carried out directly by exposure to flame, by means of hot air, by radiators or resistance heating, or in a heating duct.

Furthermore, the components of the laminated covering can be glued togehter with or without tackifiers by fusion adhesives or two-component adhesives. Examples of such adhesives are those having an unsaturated polyester base or a polyurethane base. These adhesives are well known and are described in the literature. For example, the two-component adhesives on a polyurethane base are disclosed on page 367 of the *Plastic Handbook*, 18th Edition, Carl Hanser Verlag, Munich, 1971; whereas the polyester based fusion adhesives are described on pages 360 and 361 of this publication.

Finally, the components can be joined by foaming a sheet of foam material, e.g. polyethylene during the manufacture of the multiple-layered structure, so that the thus-produced foam sheet perhaps enters the perforations of the reinforcing panel, or penetrates to the foam sheet produced or existing on the other side, so that a direct connection is formed between both foam sheets. The thus-produced and constructed multiple-layered structure is extensively insensitive to solvents, especially resistant against gasoline, mold-resistant, and is not water-absorbent. The capability of bonding to other materials and the laminating ability are excellent.

A particular advantage resides in the property of good shock absorption, in conjunction with high rigidity at a comparatively minor thickness and low weight of the panels. This combination of characteristics is absent in the individual components, namely the foam sheet and the reinforcing member of the multiple-layered structure. Corresponding measured values far exceed the sum total of the respectively measured values of the components, and thus constitute a surprising result of the selection of materials and the construction of the multiple-layered laminate covering or structure.

The modulus of elasticity measured as a standard for the rigidity is high, especially as compared to conventional multiple-layered elements made of synthetic resins.

The strongly preferred construction as a self-supporting panel is thereby made surprisingly possible; the crosslinked polyethylene of the foamed sheet, which is preferably employed, effectively contributes toward this feature.

With an appropriate formation of the multiple-layered structure or with a suitable choice of the reniforcements, the safety requirements for automotive vehicles can be fully met.

Figure 2:
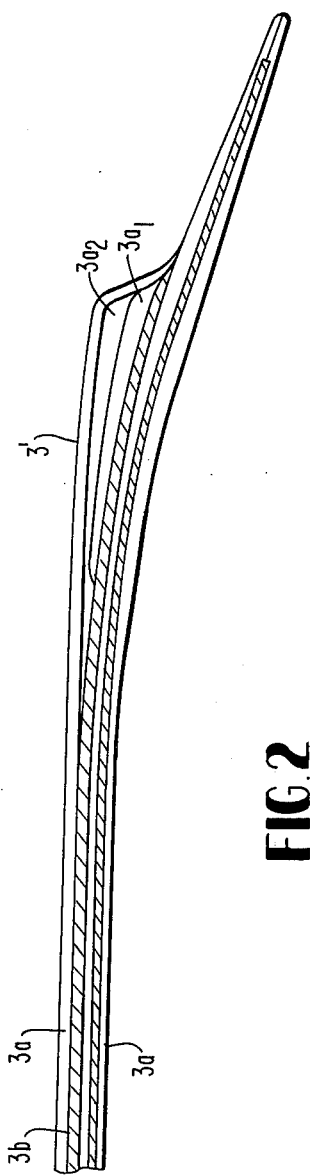

The laminate coverings of this invention will be further understood from the accompanying drawings wherein:

FIG. 1 shows an embodiment of the invention particularly suitable for the dome of an automobile body; and FIG. 2 shows a cut-away portion of a multi-layer laminate also useful for the interior covering of automobiles, e.g. the dome, padded dash, cover for a container such as a cabin or driving seat or the like.

One preferred embodiment of the covering of this invention is illustrated in FIG. 1 showing the self-supporting automobile dome in the body-installed condition in a fragmentary cross-sectional view.

The car body roof 1 of the automobile is fixedly joined to the reinforcing bracket 2, e.g. by welding. The car dome proper consists of the interior covering 3, produced as a molded component of polyethylene foam with the reinforcing members 4. The reinforcing members 4 are firmly bonded to the molded foam component 3 on the backside thereof. It is also possible to apply the reinforcing layer as an intermediate layer between two foam layers. Members 4 (as shown) span the car interior in the longitudinal direction and others are provided in transverse direction. In this connection, it is possible to provide reinforcing profile members in the longitudinal direction only within the marginal zone. The entire arrangement of the reinforcing members can also be grid-shaped. The spacing of the reinforcing members is dependent on the rigidity and the thermal expansion characteristic of the foam material employed for forming the interior covering 3. The air gap 5 between the interior covering 3 and the car roof 1, indicated in the drawing but not absolutely necessary, increases additionally the heat-insulating effect of the dome. The thickness of the vehicle dome is based on mechanical requirements. It varies between about 5 and about 20 mm.

It is also quite possible to utilize reinforcing members in a multiple-layer automobile dome which already includes a reinforcing layer.

With this construction, the reinforcing or intermediate layer may consist of continuous, laminar, closed, perforated or gauze-like panels, honey comb panels, web panels or the like, made of polyethylene or polypropylene, ethylene - propylene mixed polymers, vulcanized fiber or cellulose containing materials. Panels made of PVC, expanded metal [metal mesh], metal braid, resin saturated glass fiber tiles, gauzes, etc. may be used as reinforcement layers.

Another type of reinforcement for the polyethylene foam sheets which are to form the actual vehicle dome can be provided in the form of reinforcement sections which are rigidly connected in a longitudinal and/or transversal direction to a side of the foam sheets. In addition, it is also possible to provide reinforcement sections on one side of the polyethylene foam sheet which is already reinforced by means of an intermediate layer. In as far as the multilayer construction of the inner or interior lining 3 is concerned, it should be pointed out that a plurality of foam sheets comprising reinforcing intermediate layers can be combined to form a unit which then forms the main part of the dome 3, on the underside of which reinforcement sections 4 for example, may be applied.

Depending on the size of the vehicle and of the inside space to be fitted out, a vehicle dome structure is selected from those described above and mounted in place.

The laminate structure 3' shown in FIG. 2 consists of a plurality of layers. The outer layers consist of polyethylene foam sheets 3a which are reinforced by the interpositioning of polypropylene web or ridged panels 3b. Additional foam inserts $3a_1$, $3a_2$, are provided to give the vehicle dome a certain shape in its edge region.

The following examples further illustrate production of such multi-layer structures:

EXAMPLE 1

A sheet having a thickness of 5 mm. made of crosslinked polyethylene foam having a weight per unit volume of 30 kg./m³ (w/v), (a) a polypropylene ridged panel of a thickness of 5 mm. or (b) a polyethylene honeycomb panel of a thickness of 5 mm., and a polyethylene foam sheet of a thickness of 5 mm. of 30 w/v are permanently bonded by flame lamination by heating with a direct gas flame at surface temperatures of 230° C. and pressing between rolls and under a minor pressure of 1.5 atmospheres absolute. This product obtained with the use of (a) is illustrated in FIG. 2.

Honeycomb and ridged panels of polyethylene or polypropylene yield advantages, namely rigidity, insulation by air chambers, low weight, as well as a firm bond by being laminatable to the polyethylene foam layer.

EXAMPLE 2

A sheet of a thickness of 5 mm. made from crosslinked polyethylene foam, 30 w/v, and (a) a vulcanized fiber sheet having a thickness of 0.8 mm. or (b) a vulcanized fiber sheet having a thickness of 0.3 mm., followed by a 5 mm. thick sheet of polyethylene foam, 60 w/v, followed by (a) a vulcanized fiber sheet of 0.8 mm. or (b) a vulcanized fiber sheet of 0.3 mm., and thereafter again a 5 mm. sheet of crosslinked polyethylene foam, 30 w/v are bonded by flame lamination at 230° C. Films and/or adhesives as tackifiers are not required in this process of forming a laminate.

EXAMPLE 3

Approximately 5 mm. thick crosslinked polyethylene foam, 30 w/v; 5 to 7 mm. thick honeycomb panel of melamine resin-coated sodium craft paper; 5 mm. thick polyethylene foam, 30 w/v, are bonded continuously with the use of (a) reactive adhesives having a polyurethane base, or (b) fusion adhesives having a polyester base.

EXAMPLE 4

The materials indicated in Example 1 are pressed into a composite bonded structure as a material, preheated to 150°-170° C., in a press mold under a low pressure of less than 2 atmospheres absolute. A permanent bond is thus obtained. By providing an appropriately shaped molding press, it is simultaneously possible to shape this structure into its final configuration, e.g. into a car dome.

EXAMPLE 5

A thermoset expanded mesh having a thickness of 1.0 mm. made of (a) polypropylene and (b) impact-resistant polyvinyl chloride, with a thermal stability of shape according to Vicat of 76, is permanently joined by laminating at 160° C. as a band or strip between two sheets of 4 mm. crosslinked polyethylene foam, 30 w/v, and 8 mm. non-crosslinked polyethylene foam, 40 w/v. The resulting laminate has a thickness of 11 mm. and is suitable for use as a lining for a driving seat.

While the novel principles of the invention have been described, it will be understood that various omissions, modifications and changes in these principles may be made by one skilled in the art without departing from the spirit and scope of the invention.

What is claimed is:

1. An interior dome covering for automotive vehicles that is insulating and self-supporting, which comprises a molded laminate structure having a contoured configuration with a variable cross-section, and consisting of at least two sheets of crosslinked polyethylene foam permanently bonded together with an intermediate polymer-containing non-foamed reinforcing layer to form a multiple-layered structure; said reinforcing layer being made from a material selected from the group consisting of polyethylene, polypropylene, ethylene-propylene copolymers, vulcanized fiber reinforced rubber, polyvinylchloride, and cellulosic material impregnated with phenolic resin or melamine resin.

2. The interior covering according to claim 1, wherein the reinforcing layer is formed as a honeycomb sheet.

3. An insulating interior dome covering fashioned to be self-supporting, for automotive vehicles which comprises a molded laminate structure having a contoured configuration with a variable cross-section, and consisting of at least two crosslinked polyethylene foam sheets permanently bonded to intermediate polymer-containing non-foamed reinforcing layers to form a multiple-layer structure and profiled reinforcing insert members made of thermoplastic resin and shaped and arranged to span the laminate structure in at least one of the longitudinal direction and the transverse direction of said moled laminate structure; said reinforcing layer being made from a material selected from the group consisting of polyethylene, polypropylene, ethylene-propylene copolymers, vulcanized fiber reinforced rubber, polyvinylchloride, and cellulosic material impregnated with phenolic resin or melamine resin.

4. The interior covering according to claim 3, wherein the reinforcing members are applied to the backside of one of the polyethylene foam sheets of the laminate structure.

5. The interior covering according to claim 4, wherein the reinforcing members are cemented to the laminate structure.

6. The interior covering according to claim 4, wherein the reinforcing members are firmly bonded to the laminate structure by the effect of heat.

7. The interior covering according to claim 3, wherein the reinforcing members have a contour.

8. The interior covering according to claim 5, wherein the reinforcing members are corrugated.

9. The interior dome covering according to claim 1, wherein the sheets of polyethylene foam have identical density.

10. The interior dome covering according to claim 1, wherein the sheets of polyethylene foam have different densities.

11. The interior dome covering according to claim 3, wherein said polyethylene foam sheets have the same density.

12. The insulating interior dome covering of claim 3, wherein the polyethylene foam sheets have different density.

13. The interior dome covering according to claim 1, wherein the reinforcing layer is formed as a grid-shaped sheet.

14. The interior dome covering according to claim 1, wherein the reinforcing layer is formed as a perforated sheet.

15. The interior dome covering according to claim 1, wherein the reinforcing layer is formed as a sheet having ridges.

16. An interior dome covering for automotive vehicles that is insulating and self-supporting which consists of a molded laminate structure formed of at least one crosslinked polyehtylene foam sheet having reinforcing profiled insert members made of polyethylene or polypropylene embedded therein on one side of said sheet.

* * * * *